US006928613B1

(12) United States Patent
Ishii et al.

(10) Patent No.: US 6,928,613 B1
(45) Date of Patent: Aug. 9, 2005

(54) ORGANIZATION, SELECTION, AND APPLICATION OF VIDEO EFFECTS ACCORDING TO ZONES

(75) Inventors: Yusuke Ishii, Cupertino, CA (US); Jingxi Zhang, Foster City, CA (US)

(73) Assignee: Victor Company of Japan (JP)

( * ) Notice: Subject to any disclaimer, the term of this patent is extended or adjusted under 35 U.S.C. 154(b) by 586 days.

(21) Appl. No.: 10/010,761

(22) Filed: Nov. 30, 2001

(51) Int. Cl.[7] .............................................. G09G 5/00
(52) U.S. Cl. ...................... 715/726; 715/723; 715/719; 715/716
(58) Field of Search ................................ 715/716–732; 725/41, 112, 118

(56) References Cited

U.S. PATENT DOCUMENTS

| | | | | |
|---|---|---|---|---|
| 5,353,391 | A | * | 10/1994 | Cohen et al. ................ 345/619 |
| 5,359,712 | A | * | 10/1994 | Cohen et al. ................ 345/723 |
| 5,442,744 | A | * | 8/1995 | Piech et al. .............. 715/500.1 |
| 5,781,188 | A | * | 7/1998 | Amiot et al. ................ 345/723 |
| 6,204,840 | B1 | * | 3/2001 | Petelycky et al. ........ 715/500.1 |
| 6,546,188 | B1 | * | 4/2003 | Ishii et al. ..................... 386/52 |
| 6,628,303 | B1 | * | 9/2003 | Foreman et al. ............. 715/723 |
| 6,686,970 | B1 | * | 2/2004 | Windle ......................... 348/584 |
| 2001/0008572 | A1 | * | 7/2001 | Ohmori et al. ................ 386/52 |
| 2001/0020953 | A1 | * | 9/2001 | Moriwake et al. .......... 345/723 |
| 2002/0175917 | A1 | * | 11/2002 | Chakravarty et al. ....... 345/473 |

OTHER PUBLICATIONS

Scott Schonefeld, "Capturing & Editing Digital Video with Pinnacle Studio DV," scott.schonefeld@psb.org, 2000.*

Girgrnsohn et al, "A semi–automatic Approach to Home Video Editing," UIST'00, San Diego, CA, US 2000 ACM.*

Jim Heid, iMovie, Free and Friendly DV Video–Editing Software, http/macworld.com/2000/05/bc/11reviewimovie/, May 2000.*

Casablanca, nonliner digital video editor, System Software Version 3 Owner's Manual, DraCo Systems, Inc., Boulder, Colorado, 1999.*

"Adobe Premiere 6.0 Datasheet," Adobe Systems Incorporated, 4 pages, 2000.

"Adobe Premiere 6.0 New Feature Highlights," Adobe Systems Incorporated, www.adobe.com/premiere, pp. 1–12, 2000.

"Studio DV Datasheet," Pinnacle Systems, Inc., 2 pages, 1999.

Studio 7 Datasheet, Pinnacle Studio Version 7, Pinnacle Systems, Inc., 2001.

* cited by examiner

*Primary Examiner*—John Cabeca
*Assistant Examiner*—Tadesse Hailu
(74) *Attorney, Agent, or Firm*—Fenwick & West LLP

(57) ABSTRACT

A storyboard of video clips is divided into zones, or segments. The user selects a zone, and the invention presents a list of effects that are applicable to the selected zone. The user can select among the presented effects in order to apply the effect to the selected zone. Effects that are inapplicable to the selected zone are hidden from view and not displayed. Thus, the overall number of effects that are presented at any given time is reduced, and the process of selecting an appropriate effect is simplified and made easier for novice users.

48 Claims, 8 Drawing Sheets

ORGANIZATION, SELECTION, AND APPLICATION OF VIDEO EFFECTS ACCORDING TO ZONES

BACKGROUND OF THE INVENTION

1. Field of the Invention

The present invention is related to video editing software, and more particularly to an improved user interface for organizing, selecting, and applying video effects according to zones.

2. Description of the Background Art

Video editing software programs allow users to perform sophisticated video editing functions on commonly available consumer-level equipment. Users can record home movies on a digital camcorder, such as a JVC or Sony DV-format camcorder, and transfer the movies to a personal computer via an IEEE-1394 connection or other high-bandwidth data connection. Once the video files have been transferred to the computer, the video editing software allows the user to rearrange, trim, and edit video clips in order to create a finished movie. Such video editing software packages include, for example, Adobe Premiere (available from Adobe Systems Incorporated of San Jose, Calif.) and Pinnacle Studio DV (available from Pinnacle Systems Inc. of Mountain View, Calif.).

Some video editing software packages allow the user to perform many different types of operations and to apply different types of special effects and transformations to video clips. These include altering the color balance, adding transitions between clips, superimposing artwork, titles, and/or captions, adding music or sound effects, and many more. Users can select among these various options by activating commands within the user interface for the video editing software, for example by dragging icons representing various effects, or by selecting from a displayed set of transformations.

For novice users, the number of available special effects may be overwhelming. Such users may be interested in applying special effects to their home movies in order to make the movies more interesting or fun to watch, but may be daunted by the prospect of learning to use a sophisticated video editing software program that provides a surfeit of options at every stage of interaction. Many people attempt to undertake home moving editing projects, but fail to complete them because of the time-consuming nature of the editing process, particularly when the editing task involves defining numerous edit points and selecting appropriate effects for each edit point. Such users may therefore give up on attempting to use the video editing program, or may use only a limited subset of the program's functionality. In addition, users may become frustrated if some effects are not applicable to certain portions of video clips, and they may seek guidance in determining which effects to select for each portion.

What is needed is a mechanism for simplifying the selection and application of special effects in a video editing software application, so as to make it easier for novice users to find and apply effects appropriate to particular portions of video clips. What is further needed is a mechanism that provides users with guidance as to which effects are appropriate for which portions of video clips. What is further needed is an improved organizational scheme for video effects.

What is further needed is a user interface that provides improved organization, selection, and application of video effects so as to enable novice users to more easily perform video editing operations. What is further needed is a user interface that organizes video effects according to zones, so that only those effects applicable to a selected zone are made available at any particular time.

SUMMARY OF THE INVENTION

The present invention divides a storyboard of video clips into zones, and associates each potential effect with one or more applicable zones. The user selects a zone in the storyboard, and the invention presents a list of effects that are applicable to the selected zone. In one aspect, the invention provides a user interface whereby applicable effects are presented to the user, and the user can select among the presented effects in order to apply the effect to the previously selected zone. Effects that are inapplicable to the currently selected zone are hidden from view and not displayed. Thus, the overall number of effects that are presented at any given time is reduced, and the process of selecting an appropriate effect is simplified and made easier for novice users. Some effects may be applicable to more than one zone.

Zones may be defined according to a temporal start and end point within a video clip or within the overall storyboard of clips. For example, the storyboard may be divided into an opening zone indicating the beginning portion of the first clip, a number of scene zones indicating the middle portions of each clip, a number of transition zones indicating portions that include transitions from one clip to the next, an ending zone indicating the end portion of the last clip, and the like. The duration of each zone may be fixed or it may depend on the overall length of the video clip or of the storyboard. In one aspect, the invention may detect scene changes or other characteristics of the video content within a clip, and may place particular zone boundaries according to such content.

In one aspect of the invention, the user may activate "power-user" commands to see and select effects that are associated with zones other than the currently selected zone. Additional power-user commands may also allow users to customize effects, or to change the applicable zone, or to adapt an effect for a zone other than the one for which it was originally intended.

By categorizing effects according to applicable zone or zones, and by displaying effects that are applicable to a user-selected zone, the present invention simplifies the process of selecting and applying effects. The invention also provides improved organization of effects by virtue of zone categorization. These features of the invention provide an easy way for users, including novice users, to quickly define edit points and apply appropriate effects and thereby avoid the difficulties and excessive complexity associated with conventional video editing software programs.

Figure 1:
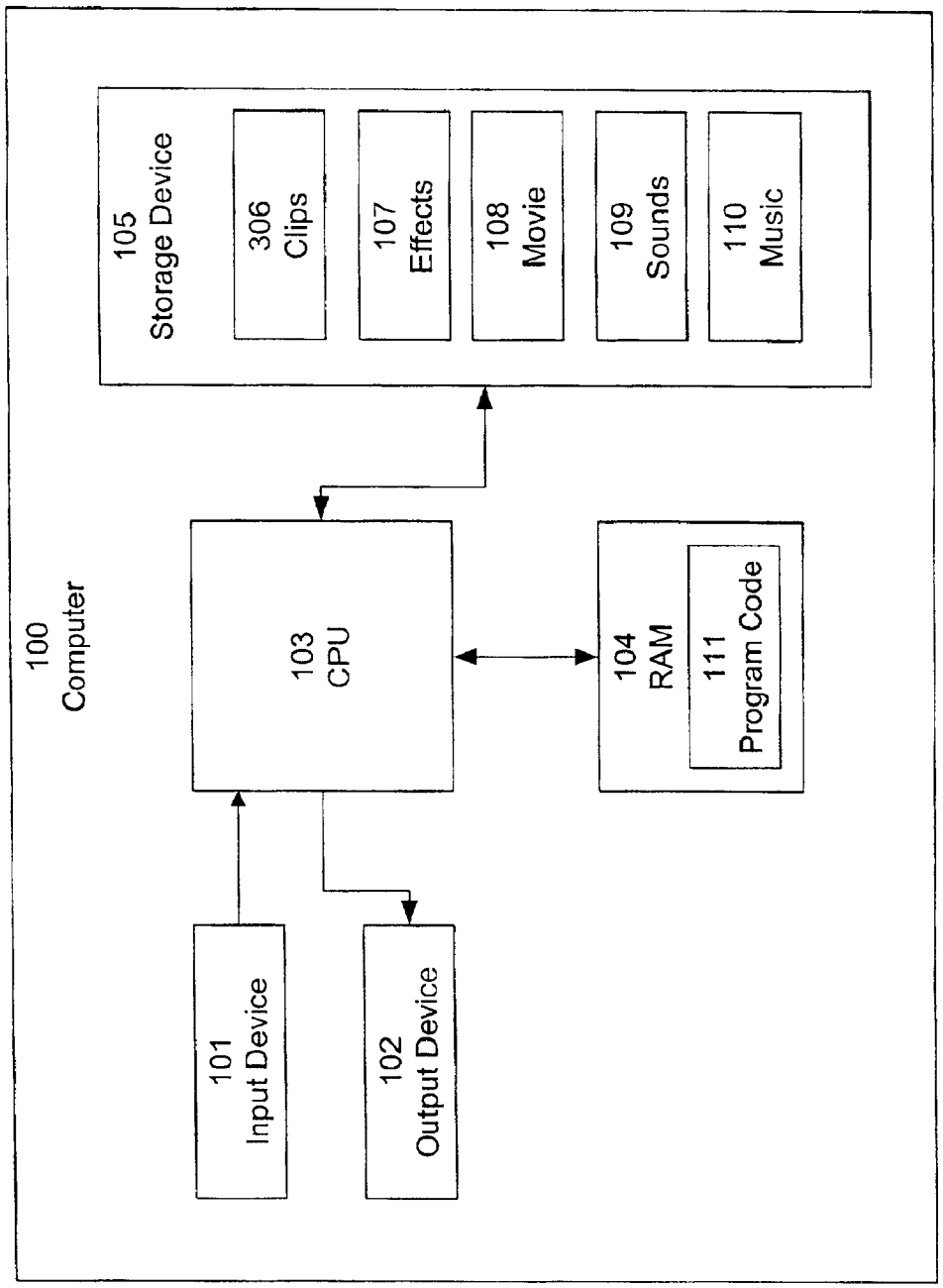
FIG. 1 is a block diagram depicting an example of a system for practicing the present invention according to one embodiment.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Referring now to FIG. 1, there is shown a block diagram depicting an example of a system for practicing the present invention according to one embodiment. As shown in FIG. 1, the invention may be implemented as software running on a conventional computer 100 such as a personal computer running an operating system such as Microsoft Windows XP, available from Microsoft Corporation of Redmond, Wash. Computer 100 includes central processing unit 103 for performing operations and functions as specified in program code 111. Program code 111 may be stored in any storage medium, such as a hard drive, compact disc read-only memory (CD-ROM), and the like. While it is being executed, code 111 is stored in random access memory (RAM) 104 so that it can easily be read and executed by CPU 103 according to techniques that are well known in the art.

Input device 101, such as a keyboard and/or mouse, allows the user to provide input in interacting with the functionality of the present invention. Output device 102, such as a screen, displays output. Computer 100 may also include appropriate connections, cards, and cables (not shown) for receiving video data from an external source such as a camcorder, and for transmitting video data to an external destination such as a camcorder, television monitor, or the like. Such connections and cables may be digital (such as IEEE-1394, USB2, or the like), or analog (such as conventional RF or video signals). Appropriate hardware for converting from one format to another may also be provided (not shown), according to techniques that are well known in the art.

Storage device 105, which may be implemented as a hard drive or other device, contains various files and resources for use by the software in performing the functions of the present invention. Such files and resources may be stored according to any known format, and may be organized in such a way that allows CPU 103, under the control of the software, to retrieve and/or modify the files and resources as needed and appropriate, and in an efficient manner. In one embodiment, storage device 105 stores clips 306 (including video clips, still images, or both), video effects 107, the final movie 108 once it has been generated by CPU 103, sounds 109, and music 110.

One skilled in the art will recognize that FIG. 1 is merely exemplary, and that the invention can be practiced on systems having other configurations and components. For example, the functionality of the invention could be implemented in a network-based application such as may be provided by an application service provider (ASP).

Figure 2:
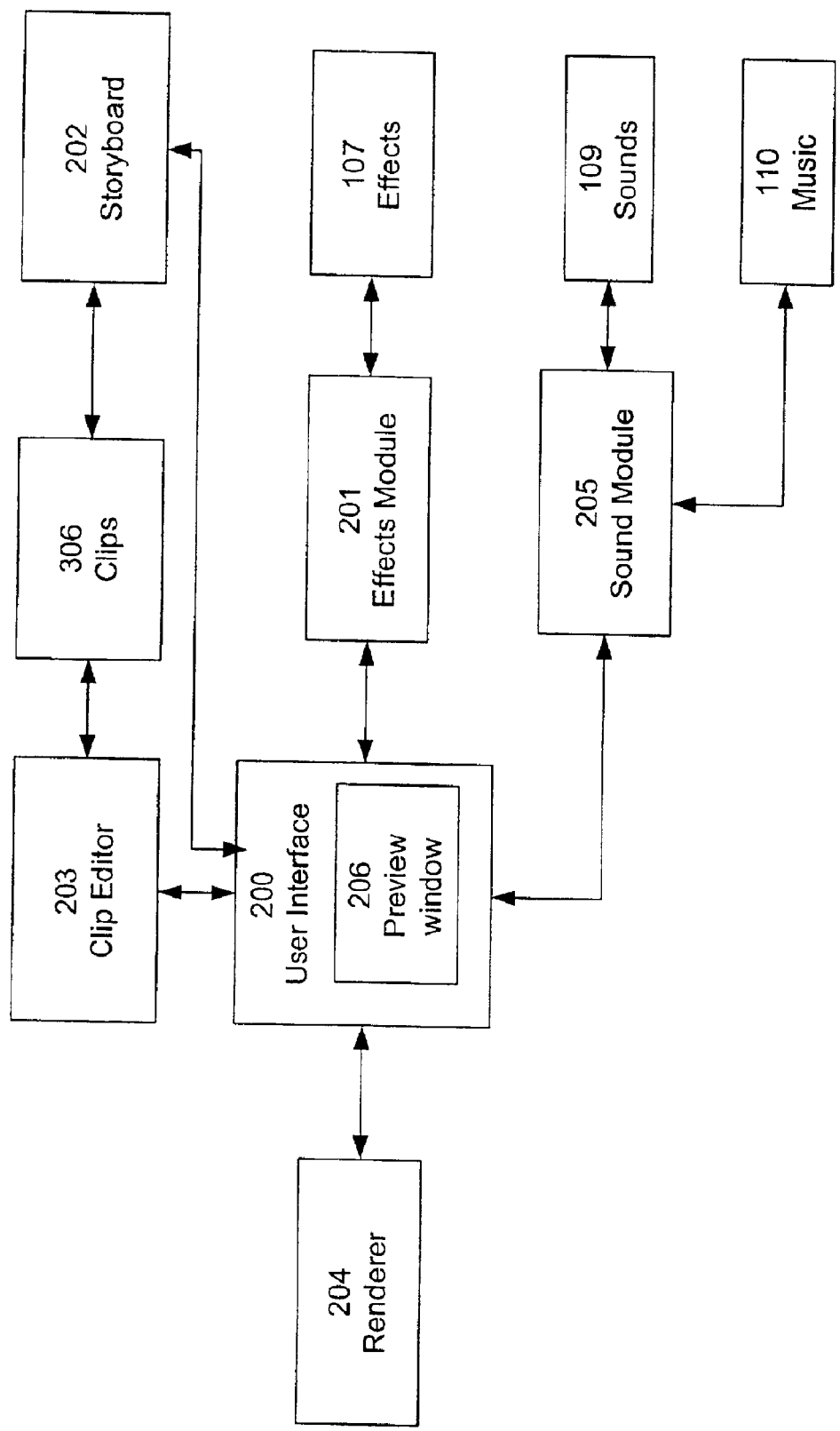
FIG. 2 is a functional block diagram depicting functional modules for practicing the present invention according to one embodiment.

Referring now to FIG. 2, there is shown a functional block diagram depicting functional modules for practicing the present invention according to one embodiment. As will be apparent to one skilled in the art, the functional modules depicted in FIG. 2 may be implemented in program code 111 that provides instructions for execution by CPU 103. For example, in an object-oriented programming environment, the functional modules of FIG. 2 may be implemented using software objects having methods and data, which are coded, compiled and run according to well-known techniques.

User interface 200 provides a mechanism by which the user can select video clips, edit and arrange them, apply special effects, and control the video editing process. User interface 200 includes a preview window 206 for displaying clips, effects, and finished movies; in one embodiment, preview window 206 is implemented using a commercially available video player such as Microsoft Windows Media Player (available from Microsoft Corporation of Redmond, Wash.). Clip editor 203, under the direction of the user via user interface 200, edits clips 306, for example by specifying the length of a clip, its starting and end points, and the like. Edited clips 306 are arranged in a storyboard 202 that keeps track of the sequence and positioning of clips 306 within the finished movie. Effects module 201 provides functionality for selecting among effects 107, under the direction of the user via user interface 200, and applying the selected effects to clips 306. Sound module 205 provides functionality for selecting among sounds 109 and music 110, under the direction of the user via user interface 200, and adding the selected sounds 109 and music 110 to clips 306. Renderer 204 performs the functionality associated with rendering a final movie 108 based on user edits, storyboard positioning, added effects, sound and music, according to rendering techniques that are well known in the art. The final movie 108 can be stored in storage device 105, or provided to an external device such as a camcorder, videocassette recorder, recordable DVD, or television monitor (not shown).

Figure 8:
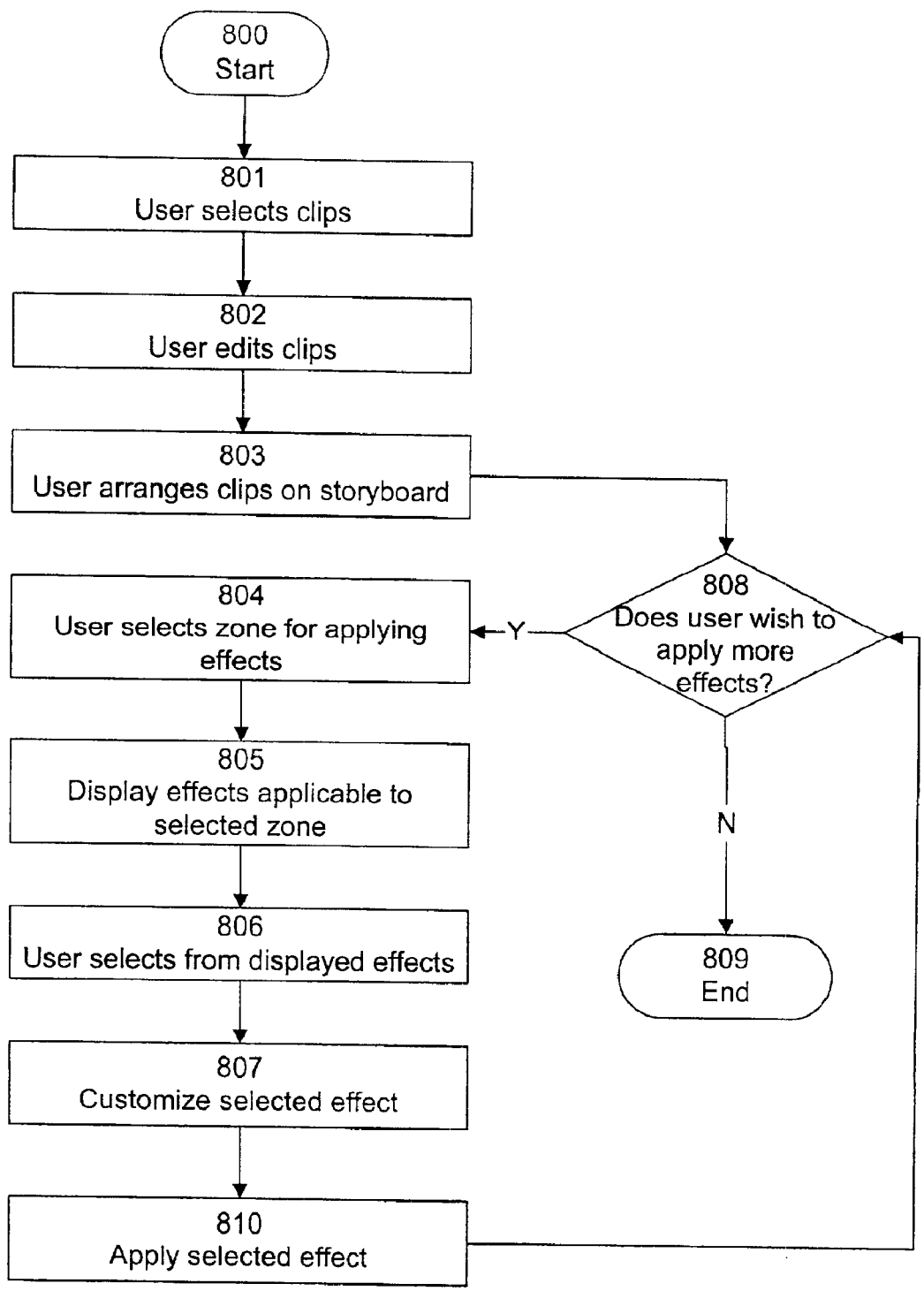
FIG. 8 is a flowchart depicting a method for selecting and applying effects according to one embodiment of the present invention.

Referring now to FIG. 8, there is shown a flowchart depicting a method for selecting and applying effects according to one embodiment of the present invention. The user selects 801 source clips 306, which may include moving video, audio, still images, or any combination thereof, for inclusion in a movie. Source clips 306 may be obtained from storage device 105; the user navigates among the contents of storage device 105 to identify the desired source clips 306, according to file management techniques that are well known in the art. The user edits 802 the selected clips 306, for example by trimming them to a shorter length. If desired, the user can also arrange 803 the selected clips 306 on a storyboard, for example by dragging the clips to various locations on the storyboard, in order to specify the sequence of clips 306 that will make up the final movie.

Figure 3:
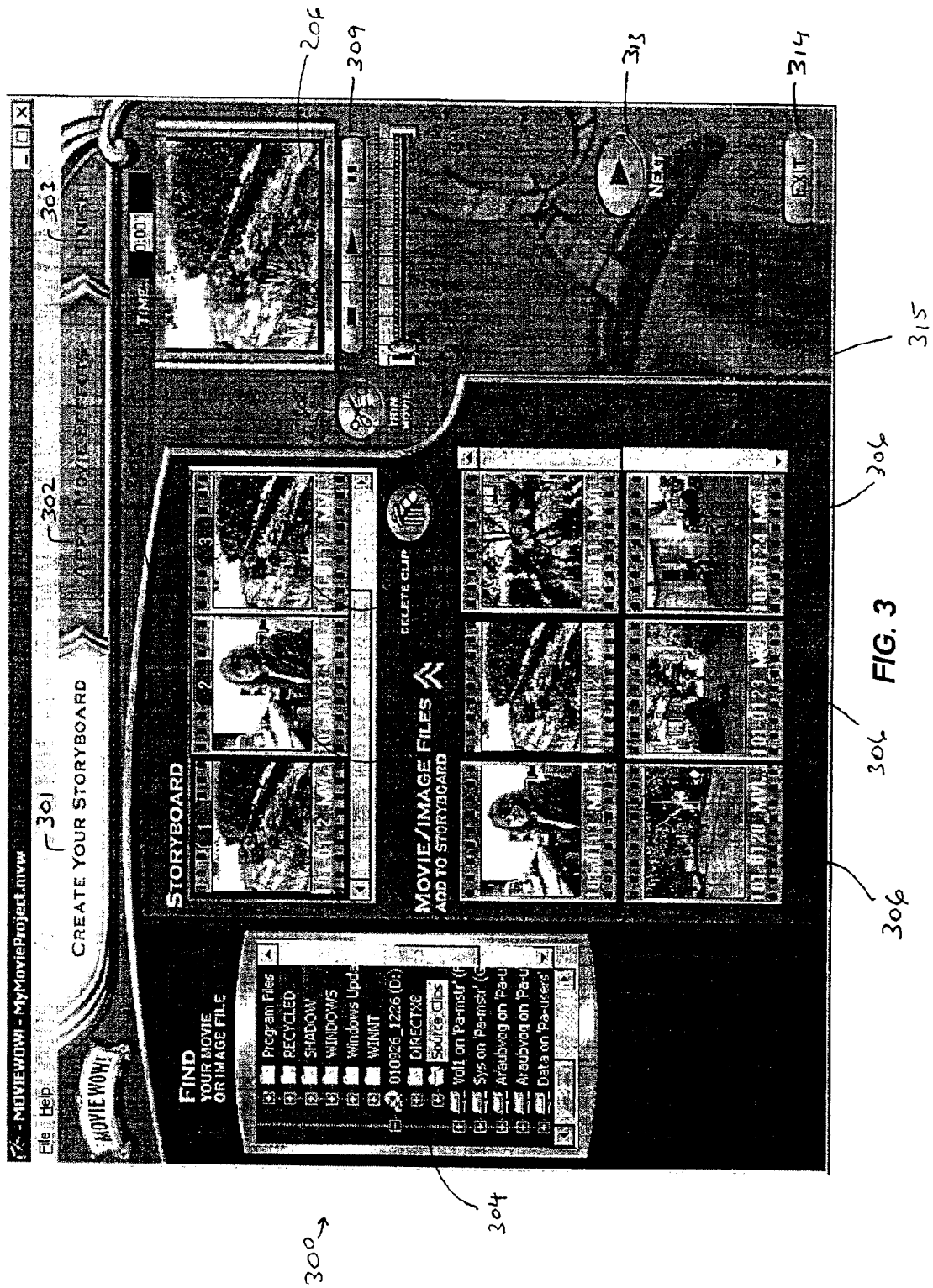
FIG. 3 is a screen shot depicting a user interface for selecting source clips and arranging them on a storyboard according to one embodiment of the present invention.

Referring also to FIG. 3, there is shown a screen shot depicting a user interface 300 for selecting source clips, editing them, and arranging them on a storyboard according to one embodiment of the present invention. The user can control the various user interface elements using a conventional pointing device, such as a mouse, to control an onscreen cursor. Screen 300 shows the first of three overall stages of operation for the video editing software application according to one embodiment. The three stages include: creating a storyboard; applying effects; and final rendering. In one embodiment, the user clicks on headings 301, 302 or 303 to navigate among the three stages, and is free to move among the stages in any order desired. In an alternative embodiment, headings 301, 302, and 303 merely act as indicators to show which stage is currently active. Accordingly, in screen 300, heading 301 is highlighted to show that the storyboard creating stage is currently active.

Navigation window 304 allows the user to navigate among devices, files and folders in a file system according to well-known techniques, to find and select a folder containing source clips. Clip files 306 (including video, audio, image files, or any combination thereof) in the selected folder are shown in window 315. Each clip 306 is represented by a single-frame image that, in one embodiment, contains the first frame of a video clip or a reduced-size version of a still image, or an indication that the clip 306 is an audio file. In alternative embodiments, other representations may be used; for example each clip 306 may be represented as a moving image that continuously displays the actual clip 306 or a portion thereof. The user can select any number of clip files 306, either one by one or in combination, to add them to storyboard 305. Storyboard 305 is a window that displays the sequence of clips 306 being laid out in the final movie presentation. The user can drag clips 306 in storyboard 305 to rearrange the order of the clips. The user can delete clips 306 from storyboard 305 by clicking on delete clip icon 307.

In one embodiment, the user can include still images along with clip files 306 in storyboard 305. Still images, which may be provided in any known image format such as JPEG, GIF, and the like, may be treated as a video clip containing a single frame. The single frame may be repeated so that the image remains on-screen for as long as desired. Thus, still images can be clipped, edited, and placed on storyboard 305 in the same manner as for other clips 306, and special effects may be selected and applied to still images in the same manner as described herein. In this manner, a user can create a movie that combines photographs with moving effects and video clips. In one embodiment, still image clips 306 are distinguished from video clips 306 in the user interface by providing a four-corner picture frame around each representation of a still image clip 306, and a filmstrip frame around each representation of a video clip 306. In other embodiments, any other technique may be provided for distinguishing still image clips 306 from video clips 306. In the remainder of this description, references to clips 306 are considered to apply equally to still images, video, and audio.

The user can select a particular clip 306 in storyboard 305 for editing. The selected clip 306 appears in preview window 206. Controls 309 are provided for playing, pausing, or stopping playback of clip 306 in preview window 206; as described above, the playback of clip 306 in preview window 206 may be implemented using a conventional video player such as Microsoft Windows Media Player. Slider 312 displays the current position of preview window 206 in relation to the duration of clip 306; the user can drag slider 312 to see any desired portion of clip 306. The user may drag clipper controls 310 and 311 to any desired position to mark the beginning and ending of the desired portion of clip 306; once controls 310 and 311 are placed in the desired position, the user can click on trim movie button 308 to trim selected clip 306. The trimmed clip 306 then replaces the original clip 306 in storyboard 305.

Next button 313 moves to the next stage, which in this case is the application of effects. Exit button 314 exits the program, after providing the user with an opportunity to save his or her work.

Referring again to FIG. 8, once the user has selected 801, edited 802, and arranged 803 the clips, he or she is given an opportunity to apply video effects. In the example of FIG. 3, the user may indicate that he or she wishes to apply effects by clicking on heading 302 or button 313. If, in 808, the user wishes to apply effects, steps 804 through 807 are performed. The user selects 804 a zone, or segment, upon which he or she wishes to apply an effect. The user interface of the present invention then displays 805 a list of effects applicable to the selected zone. The user selects 806 one of the displayed effects, and, if desired, customizes 807 the selected effect. The invention then applies 810 the selected effect to the selected zone, and returns to 808 to determine whether the user wishes to apply any more effects. The user can indicate a desire to apply more effects by selecting another effect or another zone, and can indicate a desire to proceed without applying more effects by clicking on heading 303 or button 313, as described below in connection with FIG. 4.

FIGS. 4, 5, 6, and 7 depict examples of user interface screens for applying effects to various zones of an overall movie. One skilled in the art will recognize that the particular arrangement of user interface elements and operations depicted in these figures is merely exemplary, and that other arrangements, functions, commands, and modes of operation are possible without departing from the essential characteristics of the present invention.

Figure 4:
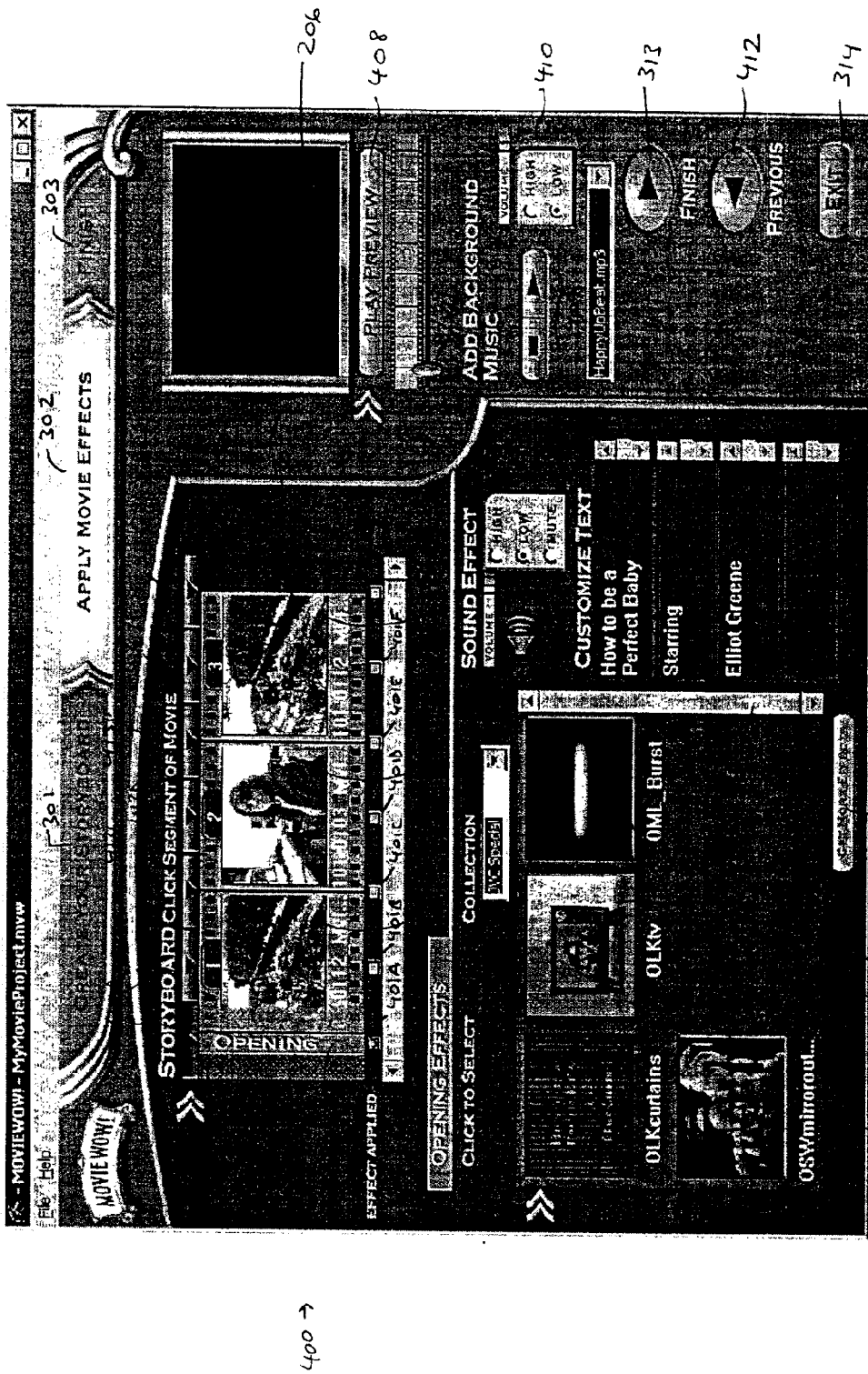
FIG. 4 is a screen shot depicting a user interface for applying opening effects according to one embodiment of the present invention.

Referring now to FIG. 4, there is shown a screen shot depicting a user interface 400 for applying opening effects according to one embodiment of the present invention. Storyboard window 305 is divided into zones 413 that can be individually selected by the user. In the example shown:

zone 413A represents the beginning portion of clip 306A;
zone 413B represents the middle portion of clip 306A;
zone 413C represents the transition between clip 306A and clip 306B;
zone 413D represents the middle portion of clip 306B;
zone 413E represents the transition between clip 306B and clip 306C;
zone 413F represents the middle portion of clip 306C; and
zone 413G represents the end portion of clip 306C.

In general, any number of zones 413 may be provided. In one embodiment, the invention defines an opening zone and an ending zone for the storyboard as a whole, as well as a transition zone for each transition from one clip 306 to the next, and a middle zone for each clip 306. The length (or duration) of each zone and the demarcation points for each zone may be preset or may depend upon content of clips 306.

For example, opening zones, ending zones, and transition zones may each be of preset length, and middle zones may be defined according to the re-maining length of each clip 306 after considering the duration of opening, ending, and transition zones that may overlap the clip 306 duration. For example, if the length of the opening zone is B, the length of the ending zone is E, the length of each transition zone is T:

the middle zone for the first clip would have a duration of $L_1-B-T/2$, where $L_1$ is the total length of the first clip;
the middle zone for the last clip would have a duration of $L_N-E-T/2$, where $L_N$ is the total length of the last clip; and
the middle zone for each other clip would have a duration of $Lx-T$, where $Lx$ is the total length of the particular clip.

If, according to any of the above calculations, the resulting length is zero or a negative number for a particular clip, the invention may omit the middle zone for that clip.

One skilled in the art will recognize that any technique may be used for defining lengths for each zone. For example, the invention may detect characteristics of the video represented by clips 306, such as movement or scene changes, and define zone durations and demarcation points accordingly.

The user clicks on a zone 413 in order to apply effects to it. In the example of FIG. 4, the user has selected zone 413A, which is the opening zone of storyboard 305. Zone indicator 415 indicates the approximate area to be affected by video effects, and displays the word OPENING to indicate that opening effects are applicable to the selected zone 413A. Window 403 displays effects 404 that are applicable to the selected zone 413A. Thus, in the example shown, effects 404 displayed in window 403 are applicable to the opening zone of a movie. Effects 404 are shown via an animated thumbnail representation of an example of the effect 404, so that the user can easily select a desired effect 404. In an alternative embodiment, other representations of effects 404 may be used, including static thumbnails, text names, brief descriptions, or the like.

As shown in the example of FIG. 4, the invention provides improved ease of use by, in one embodiment, showing only those effects 404 that are applicable to the selected zone 413. Other effects 404 that may apply to other zones 413, or zones, of storyboard 305 are not shown, so that the user is not overwhelmed with choices that would not work properly in the current context. This zoned effect scheme avoids confusion and improves the usability of the video editing software application, particularly for novice users.

In one embodiment, several collections of effects 404 may be available for each zone 413, and may be organized according to theme, style, author or creator, company, fee for use, or any other categorization scheme. Pulldown menu 402 allows selection of a collection for the selected zone 413A. If the user selects a collection other than the one currently being displayed, the invention updates window 403 by populating it with effects 404 from the selected collection. Button 405 activates a dialog box (not shown) for obtaining additional effects, for example from a website, CD-ROM, or the like. Window 403 includes scroll bar 414, and can therefore display any number of effects 404.

In one embodiment, the user can override the default behavior of the invention and see other effects 404 that may not be applicable to the currently selected zone 413A; such functionality may be useful for a "power user" who wishes to see all available effects options regardless of their applicability to a particular zone 413A. The user interface may provide such an "override" command via a pulldown menu command, or via a selection in menu 402 or button 405. If such an override is specified, window 403 is populated with additional effects 404 accordingly.

The user can select any effect 404 in window 403 for application to the selected zone 413A. The user can customize any text appearing in the effect by entering desired text in fields 407. If the effect includes sound, the user can control the volume level of the sound with radio buttons 406. One skilled in the art will recognize that any other techniques of customizing effects may be provided, and that such techniques are not essential to the claimed invention.

In one embodiment, upon user selection of an effect 404, a preview of the application of the selected effect 404 to zone 413A is displayed in window 206. In another embodiment, the preview is displayed when the user clicks on play preview button 408. In another embodiment, preview window 206 displays a preview of the entire storyboard, rather than merely displaying that portion affected by the selected effect.

Once the user has selected an effect, checkbox 401A is activated to indicate that an effect has been applied to corresponding zone 413A. The user can remove the applied effect by unchecking box 401A. One skilled in the art will recognize that, in alternative embodiments, multiple effects can be applied to the same zone 413; alternative indicators may be provided in addition to or instead of checkboxes 401, including for example, a number indicating how many effects have been applied to the zone 413, and/or a list of the applied effects.

Screen 400 also provides controls for adding background music to the movie. Such controls include pull-down menu 411 for selecting a music file, start and stop buttons 409, and volume selector 410.

Finish button 313 advances to the next stage, which in this case is the final rendering of the finished movie. Previous button 412 moves to the previous stage, which in this case is the storyboard creation stage. Exit button 314 exits the program, after providing the user with an opportunity to save his or her work.

Figure 5:
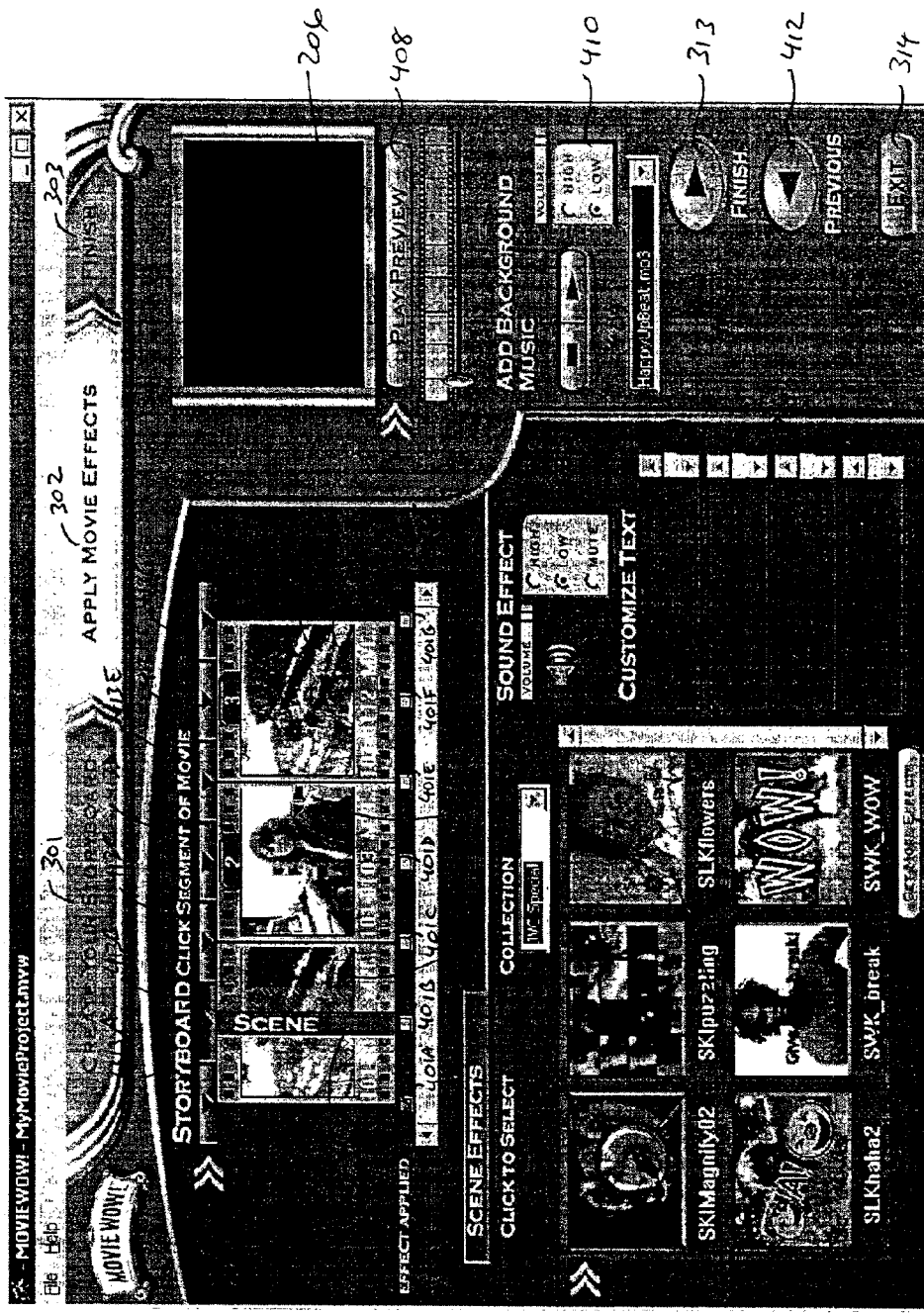
FIG. 5 is a screen shot depicting a user interface for applying scene effects according to one embodiment of the present invention.

Referring now to FIG. 5, there is shown a screen shot depicting a user interface 400 for applying scene effects according to one embodiment of the present invention. Scene effects are applicable to middle zones of video clips. In the example of FIG. 5, zone 413B, representing the middle portion of clip 306A, has been selected. Checkbox 401A is checked, indicating that the user has previously applied an effect to opening zone 413A. Zone indicator 415 now indicates the middle portion of clip 306A, and displays the word SCENE to indicate that scene effects are applicable to the selected zone 413B. Window 403 now displays effects 404 that are applicable to the selected zone 413B. Thus, in the example shown, effects 404 displayed in window 403 are applicable to the middle zone of a video clip.

As described above in connection with FIG. 4, the user can select any effect 404 for application to the selected zone 413B, and can customize text and control sound effects as described above. Once the user has selected an effect, checkbox 401B is activated to indicate that an effect has been applied to corresponding zone 413B. The user can remove the applied effect by unchecking box 401B.

Figure 6:
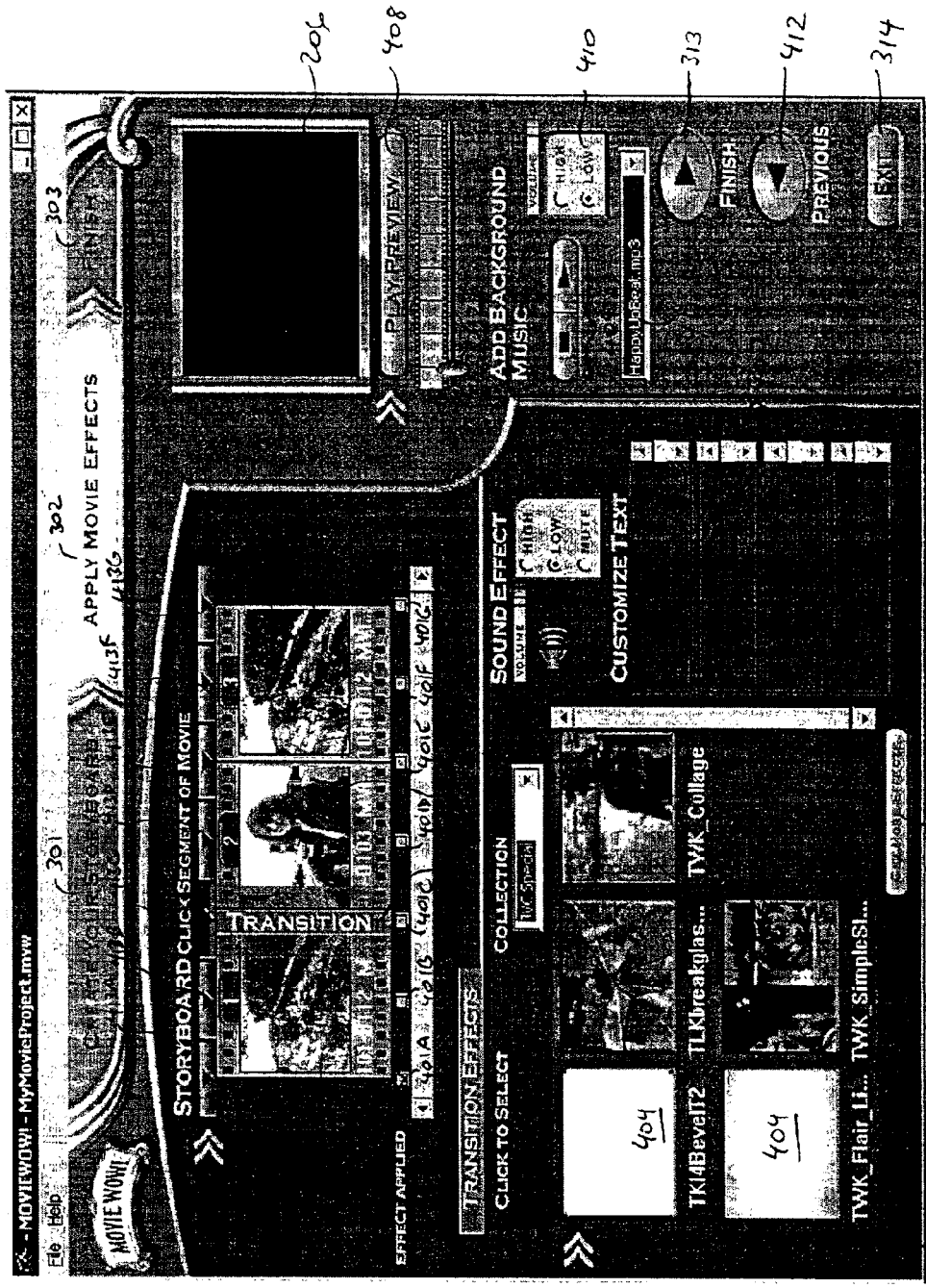
FIG. 6 is a screen shot depicting a user interface for applying transition effects according to one embodiment of the present invention.

Referring now to FIG. 6, there is shown a screen shot depicting a user interface 400 for applying transition effects according to one embodiment of the present invention. Transition effects are applicable to transitions between one video clip and the next. In the example of FIG. 6, zone 413C, representing the transition between clip 306A and clip 306B, has been selected. Checkbox 401A is checked, indicating that the user has previously applied an effect to opening zone 413A. Zone indicator 415 now indicates the transition between clip 306A and clip 306B, and displays the word TRANSITION to indicate that transition effects are applicable to the selected zone 413C. Window 403 now displays effects 404 that are applicable to the selected zone 413C. Thus, in the example shown, effects 404 displayed in window 403 are applicable to transitions.

As described above in connection with FIG. 4, the user can select any effect 404 for application to the selected zone 413C, and can customize text and control sound effects as described above. Once the user has selected an effect, checkbox 401C is activated to indicate that an effect has been applied to corresponding zone 413C. The user can remove the applied effect by unchecking box 401C.

Figure 7:
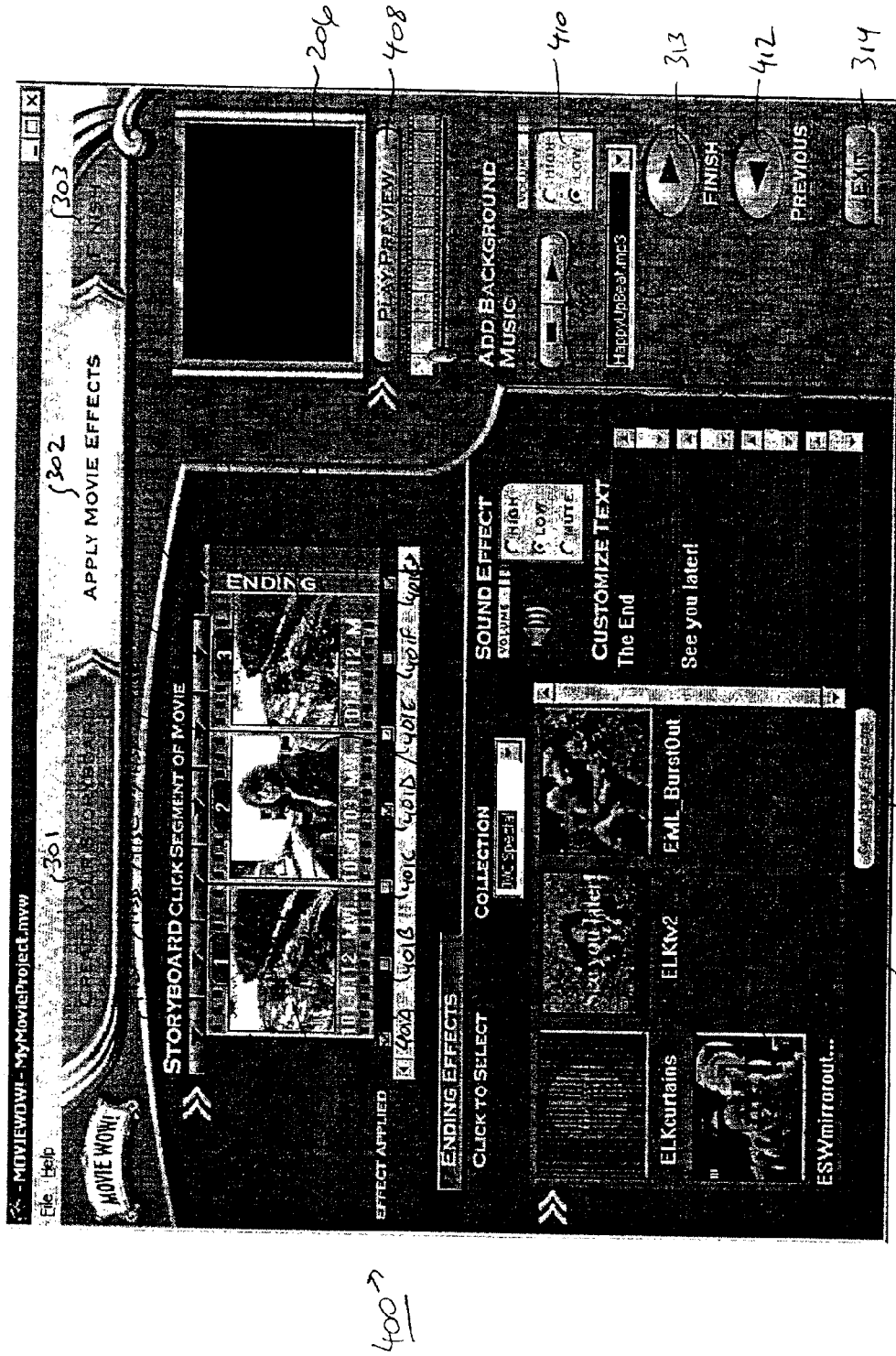
FIG. 7 is a screen shot depicting a user interface for applying ending effects according to one embodiment of the present invention.

Referring now to FIG. 7, there is shown a screen shot depicting a user interface 400 for applying ending effects according to one embodiment of the present invention. Ending effects are applicable to the ending zone of a movie. In the example of FIG. 7, zone 413G, representing the ending zone of storyboard 305, has been selected. Checkboxes 401A and 401D are checked, indicating that the user has previously applied effects to zones 413A and 413D. Zone indicator 415 now indicates the ending zone 413G of clip 306C, and displays the word ENDING to indicate that ending effects are applicable to the selected zone 413G. Window 403 now displays effects 404 that are applicable to the selected zone 413G. Thus, in the example shown, effects 404 displayed in window 403 are applicable to the end of a movie.

As described above in connection with FIG. 4, the user can select any effect 404 for application to the selected zone 413G, and can customize text and control sound effects as described above. Once the user has selected an effect, checkbox 401G is activated to indicate that an effect has been applied to corresponding zone 413G. The user can remove the applied effect by unchecking box 401G.

In one embodiment, additional commands may be available to allow the user to see and select effects that are associated with zones other than the currently selected zone. Additional commands may also allow users to customize effects, or to change the applicable zone, or to adapt an effect for a zone other than the one for which it was originally intended. Alternatively, a mode may be provided wherein the user selects a desired effect, and the user interface indicates which zones are appropriate targets for the selected effect; the user can then select among the indicated zones.

As can be seen from the above examples, the present invention provides mechanisms and techniques for applying video effects according to zones. As will be understood by those familiar with the art, the invention may be embodied in other specific forms without departing from the spirit or essential characteristics thereof. For example, the particular architectures depicted above are merely exemplary of one implementation of the present invention. One skilled in the art will recognize that zone-based effects can be used in other contexts than video editing, such as for example sound effects or image processing. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

What is claimed is:

1. A user interface for applying at least one of a set of effects to at least one source clip, the user interface comprising:

a first screen area for displaying a storyboard comprising at least one source clip, the storyboard comprising at least two zones, each zone extending across at least one of the source clips, each zone being individually selectable;

a second screen area for, responsive to a selection of a zone, displaying a subset of the set of effects, the subset including at least one effect applicable to the selected zone, wherein the subset of the set of effects omits effects that are inapplicable to the selected zone; and an effect selector, for accepting a user selection of an effect from the displayed subset for application to the selected zone.

2. A user interface for applying at least one of a set of effects to at least one source clip, the user interface comprising:

a first screen area for displaying a storyboard comprising at least one source clip, the storyboard comprising at least two zones, each zone extending across at least one of the source clips, each zone being individually selectable, wherein each of at least a subset of the zones is automatically defined based on source clip content;

a second screen area, for, responsive to a selection of a zone, displaying a subset of the set of effects, the subset including at least one effect applicable to the selected zone; and an effect selector, for accepting a user selection of an effect from the displayed subset for application to the selected zone.

3. The user interface of claim 1 or 2, wherein the first screen area comprises a storyboard window.

4. The user interface of claim 1 or 2, wherein the second screen area comprises an effect list.

5. The user interface of claim 4, wherein the effect list comprises a plurality of icons, each icon representing an effect.

6. The user interface of claim 4, wherein the effect list comprises a plurality of animations, each animation representing an effect.

7. The user interface of claim 1 or 2, further comprising:

a third screen area, for outputting a result of application of an effect to at least one source clip.

8. The user interface of claim 7, wherein the third screen area comprises a preview window.

9. The user interface of claim 1 or 2, wherein each source clip comprises a video clip, and wherein each effect comprises a video effect.

10. The user interface of claim 1 or 2, wherein each source clip comprises an audio clip, and wherein each effect comprises an audio effect.

11. The user interface of claim 1 or 2, wherein each source clip comprises an image, and wherein each effect comprises an image effect.

12. The user interface of claim 1 or 2, wherein the effect selector comprises a user-controlled cursor.

13. The user interface of claim 1 or 2, wherein each of at least a subset of the zones is of predefined length.

14. The user interface of claim 1 or 2, wherein the zones comprise at least a subset from the group consisting of:

an opening zone occurring at the beginning of the storyboard;

an ending zone occurring at the end of the storyboard;

a middle zone occurring within a source clip; and a transition zone occurring across a boundary between two source clips.

15. A computer-implemented method for applying at least one of a set of effects to at least one source clip, the method comprising:

displaying a storyboard comprising at least one source clip, the storyboard comprising at least two zones, each zone extending across at least one of the source clips, each zone being individually selectable;

receiving user input selecting a zone;

displaying a subset of the set of effects, the subset including at least one effect applicable to the selected zone, wherein the subset of the set of effects omits effects that are inapplicable to the selected zone; and receiving user input selecting an effect from the displayed subset for application to the selected zone.

16. A computer-implemented method for applying at least one of a set of effects to at least one source clip, the method comprising:

automatically defining a plurality of zones based on source clip content;

displaying a storyboard comprising at least one source clip, the storyboard comprising at least two of the zones, each zone extending across at least one of the source clips, each zone being individually selectable;

receiving user input selecting a zone;

displaying a subset of the set of effects, the subset including at least one effect applicable to the selected zone; and receiving user input selecting an effect from the displayed subset for application to the selected zone.

17. The method of claim 15 or 16, wherein displaying a subset of the set of effects comprises displaying a plurality of icons, each icon representing an effect.

18. The method of claim 15 or 16, wherein displaying a subset of the set of effects comprises displaying a plurality of animations, each animation representing an effect.

19. The method of claim 15 or 16, further comprising:

applying the selected effect to the selected zone.

20. The method of claim 19, further comprising:

outputting a result of application of the selected effect to the selected zone.

21. The method of claim 15 or 16, wherein each source clip comprises a video clip, and wherein each effect comprises a video effect.

22. The method of claim 15 or 16, wherein each source clip comprises an audio clip, and wherein each effect comprises an audio effect.

23. The method of claim 15 or 16, wherein each source clip comprises an image, and wherein each effect comprises an image effect.

24. The method of claim 15 or 16, wherein each of at least a subset of the zones is of predefined length.

25. The method of claim 15 or 16, wherein the zones comprise at least a subset from the group consisting of:

an opening zone occurring at the beginning of the storyboard;

an ending zone occurring at the end of the storyboard;

a middle zone occurring within a source clip; and a transition zone occurring across a boundary between two source clips.

26. A system for applying at least one of a set of effects to at least one source clip, the system comprising:

a storyboard display, for displaying a storyboard comprising at least one source clip, the storyboard comprising at least two zones, each zone extending across at least one of the source clips, each zone being individually selectable;

an input device, coupled to the storyboard display, for receiving user input selecting a zone; and an effects display, coupled to the input device, for, responsive to a selection of a zone, displaying a subset of the set of effects, the subset including at least one effect applicable to the selected zone, wherein the subset of the set of effects omits effects that are inapplicable to the selected zone;

wherein the input device accepts a user selection of an effect from the displayed subset for application to the selected zone.

27. A system for applying at least one of a set of effects to at least one source clip the system comprising:

a storyboard display, for displaying a storyboard comprising at least one source clip, the storyboard comprising at least two zones, each zone extending across at least one of the source clips, each zone being individually selectable;

a source clip content analyzer, coupled to the storyboard display, for defining at least a subset of the zones based on source clip content;

an input device, coupled to the storyboard display, for receiving user input selecting a zone; and an effects display, coupled to the input device, for, responsive to a selection of a zone, displaying a subset of the set of effects, the subset including at least one effect applicable to the selected zone;

wherein the input device accepts a user selection of an effect from the displayed subset for application to the selected zone.

28. The system of claim 26 or 27, wherein the storyboard display and the effects display are provided on a common display screen.

29. The system of claim 26 or 27, wherein the effects display presents a plurality of icons, each icon representing an effect.

30. The system of claim 26 or 27, wherein the effects display presents a plurality of animations, each animation representing an effect.

31. The system of claim 26 or 27, further comprising:

an effects module, coupled to the effects display, for applying at least one selected effect to at least one selected zone.

32. The system of claim 31, further comprising:

a preview display, coupled to the effects module, for outputting a result of application of the at least one selected effect.

33. The system of claim 26 or 27, wherein each source clip comprises a video clip, and wherein each effect comprises a video effect.

34. The system of claim 26 or 27, wherein each source clip comprises an audio clip, and wherein each effect comprises an audio effect.

35. The system of claim 26 or 27, wherein each source clip comprises an image, and wherein each effect comprises an image effect.

36. The system of claim 26 or 27, wherein each of at least a subset of the zones is of predefined length.

37. The system of claim 26 or 27, wherein the zones comprise at least a subset from the group consisting of:

an opening zone occurring at the beginning of the storyboard;

an ending zone occurring at the end of the storyboard;

a middle zone occurring within a source clip; and a transition zone occurring across a boundary between two source clips.

38. A computer program product comprising a computer-usable medium having computer-readable code embodied therein for applying at least one of a set of effects to at least one source clip, the computer program product comprising:

computer-readable program code configured to cause a computer to display a storyboard comprising at least one source clip, the storyboard comprising at least two zones, each zone extending across at least one of the source clips, each zone being individually selectable;

computer-readable program code configured to cause a computer to receive user input selecting a zone;

computer-readable program code configured to cause a computer to display a subset of the set of effects, the subset including at least one effect applicable to the selected zone, wherein the subset of the set of effects omits effects that are inapplicable to the selected zone; and computer-readable program code configured to cause a computer to receive user input selecting an effect from the displayed subset for application to the selected zone.

39. A computer program product comprising a computer-usable medium having computer-readable code embodied therein for applying at least one of a set of effects to at least one source clip, the computer program product comprising:

computer-readable program code configured to cause a computer to, automatically define a plurality of zones based on source clip content;

computer-readable program code configured to cause a computer to display a storyboard comprising at least one source clip, the storyboard comprising at least two of the zones, each zone extending across at least one of the source clips, each zone being individually selectable;

computer-readable program code configured to cause a computer to receive user input selecting a zone;

computer-readable program code configured to cause a computer to display a subset of the set of effects, the subset including at least one effect applicable to the selected zone; and computer-readable program code configured to cause a computer to receive user input selecting an effect from the displayed subset for application to the selected zone.

40. The computer program product of claim 38 or 39, wherein the computer-readable program code configured to cause a computer to display a subset of the set of effects comprises computer-readable program code configured to cause a computer to display a plurality of icons, each icon representing an effect.

41. The computer program product of claim 38 or 39 wherein the computer-readable program code configured to cause a computer to display a subset of the set of effects comprises computer-readable program code configured to cause a computer to display a plurality of animations, each animation representing an effect.

42. The computer program product of claim 38 or 39, further comprising:

computer-readable program code configured to cause a computer to apply the selected effect to the selected zone.

43. The computer program product of claim 42, further comprising:

computer-readable program code configured to cause a computer to output a result of application of the selected effect to the selected zone.

44. The computer program product of claim 38 or 39, wherein each source clip comprises a video clip, and wherein each effect comprises a video effect.

45. The computer program product of claim 38 or 39, wherein each source clip comprises an audio dip, and wherein each effect comprises an audio effect.

46. The computer program product of claim 38 or 39, wherein each source clip comprises an image, and wherein each effect comprises an image effect.

47. The computer program product of claim 38 or 39, wherein each of at least a subset of the zones is of predefined length.

48. The computer program product of claim 38 or 39, wherein the zones comprise at least a subset from the group consisting of:

an opening zone occurring at the beginning of the storyboard;

an ending zone occurring at the end of the storyboard;

a middle zone occurring within a source clip; and a transition zone occurring across a boundary between two source clips.

* * * * *

UNITED STATES PATENT AND TRADEMARK OFFICE
CERTIFICATE OF CORRECTION

PATENT NO.    : 6,928,613 B1
DATED         : August 9, 2005
INVENTOR(S)   : Yusuke Ishii and Jingxi Zhang It is certified that error appears in the above-identified patent and that said Letters Patent is hereby corrected as shown below:

Column 15,
Line 5, delete "dip" and insert -- clip --.

Signed and Sealed this

Third Day of January, 2006

JON W. DUDAS
*Director of the United States Patent and Trademark Office*